(12) United States Patent
Chakradhar et al.

(10) Patent No.: US 8,442,927 B2
(45) Date of Patent: May 14, 2013

(54) DYNAMICALLY CONFIGURABLE, MULTI-PORTED CO-PROCESSOR FOR CONVOLUTIONAL NEURAL NETWORKS

(75) Inventors: Srimat Chakradhar, Manalapan, NJ (US); Murugan Sankaradas, Dayton, NJ (US); Venkata S. Jakkula, Bordentown, NJ (US); Srihari Cadambi, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 634 days.

(21) Appl. No.: 12/697,823

(22) Filed: Feb. 1, 2010

(65) Prior Publication Data

US 2011/0029471 A1    Feb. 3, 2011

Related U.S. Application Data

(60) Provisional application No. 61/229,984, filed on Jul. 30, 2009.

(51) Int. Cl.
*G06F 15/18* (2006.01)
*G06F 15/00* (2006.01)
*G06G 7/00* (2006.01)

(52) U.S. Cl.
USPC .................. 706/22; 706/42; 712/15; 712/34

(58) Field of Classification Search .................... 706/22, 706/42; 712/15, 34
See application file for complete search history.

(56) References Cited

PUBLICATIONS

Sankaradas et al ("A Massively Parallel Coprocessor for Convolutional Neural Networks" Jul. 2009).*
Carta et al ("Reconfigurable Coprocessor for Multimedia Application Domain" 2006).*
Boa et al ("RCMP: A Reconfigurable Chip-Multiprocessor Architecture" 2006).*
Perri et al ("A high-performance fully reconfigurable FPGA-based 2D convolution processor" 2004).*
Hofmann et al (SDVMR: A Scalable Firmware for FPGA-based Multi-Core Systems-on-Chip 2008).*

* cited by examiner

*Primary Examiner* — Lut Wong
(74) *Attorney, Agent, or Firm* — Joseph Kolodka; James Bitetto

(57) ABSTRACT

A coprocessor and method for processing convolutional neural networks includes a configurable input switch coupled to an input. A plurality of convolver elements are enabled in accordance with the input switch. An output switch is configured to receive outputs from the set of convolver elements to provide data to output branches. A controller is configured to provide control signals to the input switch and the output switch such that the set of convolver elements are rendered active and a number of output branches are selected for a given cycle in accordance with the control signals.

5 Claims, 6 Drawing Sheets

DYNAMICALLY CONFIGURABLE, MULTI-PORTED CO-PROCESSOR FOR CONVOLUTIONAL NEURAL NETWORKS

RELATED APPLICATION INFORMATION

This application claims priority to provisional application Ser. No. 61/229,984 filed on Jul. 30, 2009, incorporated herein by reference.

BACKGROUND

1. Technical Field

The present invention relates to convolutional neural networks (CNNs) and more particularly to a system and method for configuring a coprocessor to address accelerating CNNs.

2. Description of the Related Art

Convolutional neural networks (CNNs) have found widespread use in applications that extract intelligence from large amounts of raw data. Applications range from recognition and reasoning (such as, handwriting recognition, facial expression recognition and video surveillance) to intelligent text applications (such as semantic text analysis and natural language processing applications, etc.). General-purpose processors do not fully exploit the abundant parallelism inherent in CNNs. As a result, even modern multi-core processors have poor performance due to threading overheads when they exploit the fine-grained parallelism in CNNs. Since many applications have stringent real-time performance and power constraints, conventional processors fail to adequately handle CNNs.

Artificial neural networks are computational models fashioned after the biological neural networks of the brain. They have found applications in a large number of diverse domains such as video and image processing, medical diagnosis systems and financial forecasting. These computation models serve one of two roles: pattern recognition to provide a meaningful categorization of input patterns, or functional approximation where the models find a smooth function that approximates the actual mapping between input and output patterns. These computation models are now embedding intelligence into applications by performing tasks such as recognizing scenes, semantics, and interpreting content from unstructured data. Intelligent classifiers with online learning to perform content-based image retrieval, semantic text parsing and object recognition are expected to be key components of future server and embedded system workloads.

A vast majority of these computational models are still implemented in software on general-purpose, embedded processors. However, these processors do not fully exploit the parallelism inherent in these computational models. Consequently, numerous custom hardware implementations have been proposed, and all the methods attempt to parlay the abundant parallelism inherent in these computational models into significantly higher performance.

A special kind of multi-layer artificial neural network (CNN), has found increasing use in several new applications. CNNs were designed to recognize visual patterns directly from pixel images with very minimal preprocessing of the image. CNNs can recognize patterns with extreme variability (such as handwritten characters), and their recognition ability is not impaired by distortions or simple geometric transformations of the image. Although CNNs were originally intended to accomplish recognition tasks in documents and images, CNNs are now being successfully used in non-vision applications such as semantic analysis. This trend is dramatically increasing their breadth and applicability.

CNNs are a specific kind of neural networks with a unique architecture. Traditionally, neural networks have multiple layers of neurons (an input layer, output layer and one or more so-called hidden layers) where each neuron computes a weighted sum of all its inputs, followed by a non-linear or sigmoid function to restrict its output value within a reasonable range. CNNs are neural networks that use a small 1-D or 2-D array of weights that are convolved with the inputs. In contrast to traditional neural networks, the weights are shared across several inputs.

The fact that CNNs use small kernels of weights forces the extraction of local features by restricting the receptive fields of hidden units to be local. In other words, only a limited number of inputs determine the value of the hidden unit. As an example, consider one layer of a multi-layer neural network and the task of connecting 100 inputs (organized as a 10×10 image) in the input layer of the artificial neural network to 36 hidden units (organized as a 6×6 image) that are part of one feature map. A typical neural network would connect every input to every hidden unit, and the network ends up with 100*36=3600 different weights.

In a CNN architecture, each hidden unit depends only on a small number of inputs, say 25 inputs. Then, only 25 weights are necessary to connect the inputs to a hidden unit. The same weights are then re-used for the remaining hidden units, with the receptive field of each hidden unit being restricted to a set of 25 inputs. Receptive fields of neighboring hidden units overlap, and the degree of overlap can be pre-specified. The total number of weights used in the CNN is 36×25=900. However, there are only 25 distinct weights. If we represent the 25 distinct weights as a 5×5 matrix (also called a kernel matrix), then the hidden units (6×6 image) can be computed as the convolution of the 10×10 input image with the 5×5 kernel matrix. After the convolution step, the value of every hidden unit is subjected to a squashing function (non-linearity). Now, we have a 6×6 image in which a feature of interest has been detected, and the exact location of the feature becomes less important. A simple way to reduce the precision with which the distinctive features are encoded in the image is to reduce the spatial resolution of the image by using subsampling. A typical CNN has multiple layers of hidden units.

Evaluating a trained CNN (also known as a feed-forward network) involves performing several convolutions with considerable data movement. Convolutions constitute the performance bottleneck, and orchestration of data movement is extremely difficult. The performance bottleneck can be severe in typical scenarios where a CNN may be employed. Consider a simple face recognition application that is used on relatively high resolution streaming images. With a 320×240 (QVGA) image, a feed forward CNN network that can be used to identify faces within all possible 32×32 windows in the image runs at approximately 6.5 frames per second on a 2.5 GHz Intel Xeon processor when optimized using BLAS (Intel MKL v11). Multi-threading this to 4 and 8 cores on quad-core and dual quad-core machines only improves the speed by a little over 2× due to synchronization overheads, and the fact that different threads share common inputs. Therefore, the most optimized software implementation on state-of-the-art processors achieves about 13 frames per second for a QVGA image, but this speed will decrease by a factor of 4 (to about 3 frames per second) when VGA (640× 480) images are analyzed. VGA (or larger) images are more realistic in practical use-case scenarios such as security cameras.

SUMMARY

We utilize parallelism that CNN workloads offer to improve the feed-forward processing speeds close to real-time. To this end, we provide a dynamically reconfigurable architecture in which the hardware parallelism can be tailored to suit the parallelism offered by the specific application workload. A coprocessor architecture includes an input switch, a processing core and output switch. The processing core includes several convolver primitives, and several chains each with non-linearity and sub-sampling units. The input switch connects external memory to convolver primitives, is dynamically (on-the-fly) reconfigurable and can match varying numbers of memory ports to convolver primitives. The output switch connects the convolver primitives to non-linearity/sub-sampling chains. The output switch includes a dynamically reconfigurable tree of adders that aggregate the outputs of several convolvers and connect them to one non-linearity/sub-sampling chain. Given a convolutional neural network, a method generates a program to configure the coprocessor architecture to determine the number of convolvers needed, how the convolvers are to be grouped by the input switch, the structure of the adder tree in the output switch A coprocessor and method for processing convolutional neural networks includes a configurable input switch coupled to an input. A plurality of convolver elements are enabled in accordance with the input switch. An output switch is configured to receive outputs from the set of convolver elements to provide data to output branches. A controller is configured to provide control signals to the input switch and the output switch such that the set of convolver elements are rendered active and a number of output branches are selected for a given cycle in accordance with the control signals.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
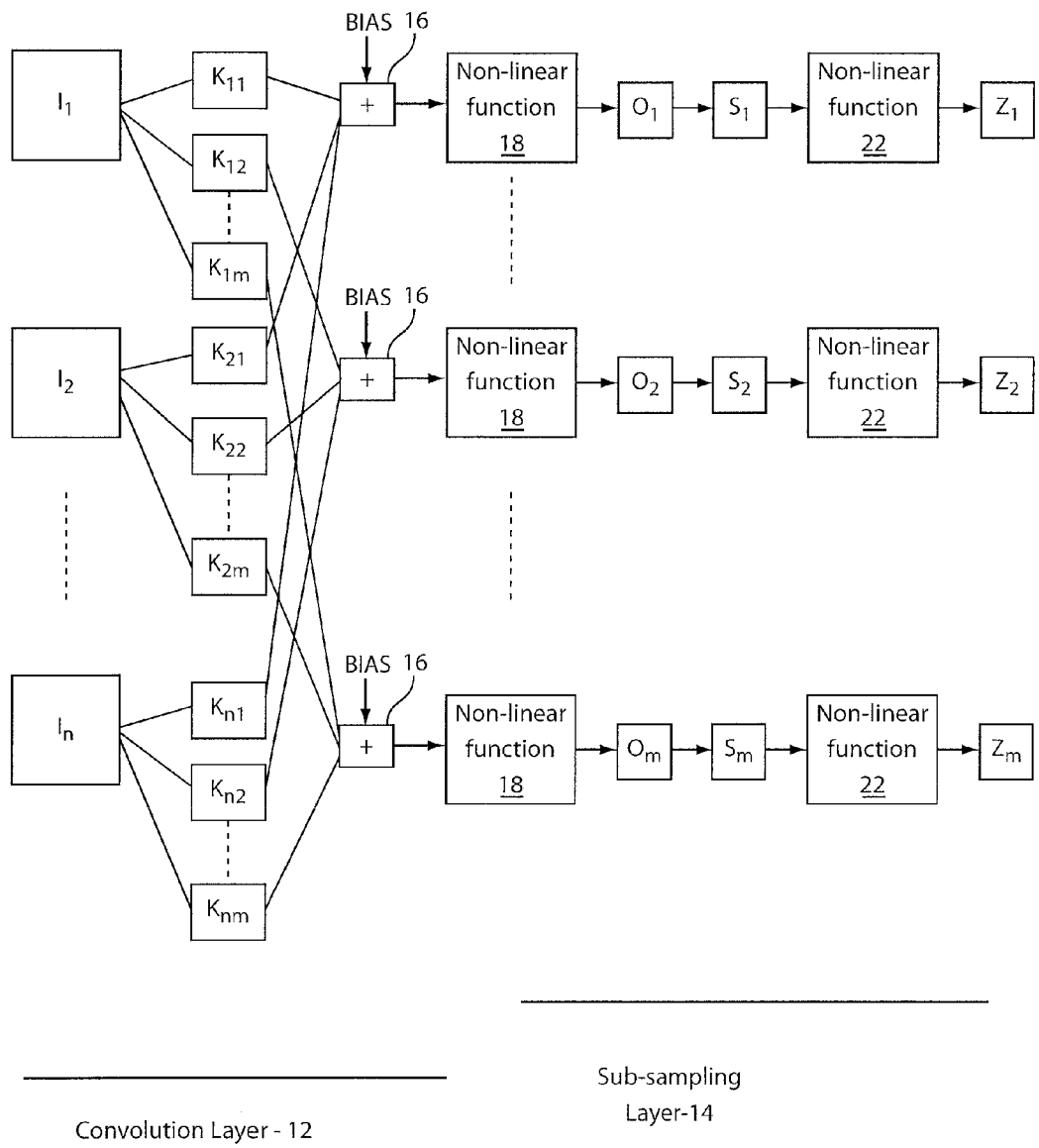
FIG. 1 is a block diagram showing a conventional static convolutional neural network processor.

A co-processor architecture automatically analyzes convolutional neural network (CNN) workloads and dynamically configures its hardware and software components to match the exact mix of different types of parallelism in a given CNN workload. A high abstraction-level software API (application program interface), along with a run-time software component, allows domain-experts to easily specify and execute arbitrary convolutional neural network workloads. Unlike prior work, the present co-processor architecture is forward-scalable. As we scale the number of processing elements, and the available off-chip memory bandwidth, CNN applications continue to automatically improve in performance. Domain-experts do not have to re-write the application. Instead, a software run-time component determines the optimal configuration of processing elements (and memory architecture) for each layer of the CNN workload, and the coprocessor architecture is dynamically configured to match the workload characteristics. This permits the throughput and performance of the coprocessor architecture to be very close to peak. The new architecture advocates the use of additional transistors enabled by Moore's Law to support reconfigurability rather than more cache or processing elements. Dynamic configurability in hardware is fast (single-cycle), and it is under the control of software.

Convolutional neural networks have found wide-spread use in applications that extract intelligence from large amounts of raw data. Applications range from recognition and reasoning (such as handwriting recognition, facial expression recognition and video surveillance) to intelligent text applications (such as semantic text analysis and natural language processing applications). General-purpose processors do not fully exploit the abundant parallelism inherent in Convolutional Neural Networks (CNNs). In accordance with the present principles, parallelism in a CNN is translated into higher performance by using custom programmable, parallel architectures. Two observations drive the design of the new architecture. First, CNN workloads exhibit three different types of parallelism: parallelism within a convolution operation, intra-output parallelism where multiple input sources (features) are combined to create a single output, and inter-output parallelism where multiple, independent outputs (features) are computed simultaneously. Workloads differ significantly across different CNN applications, and across different layers of a CNN. Specifically, workloads exhibit a widely varying mix of the three types of parallelism.

Using threads to model the three types of parallelism in software is inefficient due to their fine-grained nature. In addition, the number of processing elements in an architecture continues to scale (as per Moore's law) much faster than off-chip memory bandwidth (or pin-count) of chips. Based on these observations, a given number of processing elements and off-chip memory bandwidth, a new CNN hardware architecture that dynamically configures the hardware on-the-fly to match the specific mix of parallelism in a given workload provide the best throughput performance. Furthermore, the performance of CNN workloads is more sensitive to the division of the available bandwidth amongst multiple memory ports, rather than the total aggregate off-chip memory bandwidth.

The scalability of the new architecture with respect to scaling (increase) in number of processing elements is addressed, as well as memory bandwidth. The dynamic configurability and multiple memory ports (for CNN workloads, three ports are sufficient) have a first-order effect on performance. Performance gains due to increased parallelism can be quickly offset by the cost of realizing complex control and data flows (and off-chip memory transfers) that are necessary to manage intermediate data. The amount of intermediate data generated depends heavily on the specific parallelization strategy that is employed. By using dynamic configurability and multiple memory ports, we balance parallel execution with the cost of intermediate data management. Ease of programming the co-processor is another concern addressed.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

CONVOLUTIONAL NEURAL NETWORKS: The forward propagation phase of a CNN will be reviewed for completeness. We do not consider the learning phase of the CNN that determines the kernel values that will be used in each layer for simplicity. Rather, it is assumed that a trained CNN is available and focus on forward propagation. Tasks performed by end-users (to classify images, for example) involve forward propagation on trained CNNs. There are often stringent real-time performance and power constraints, and hardware acceleration is necessary to achieve these goals. Forward propagation is also a core computation in the back-propagation based learning algorithm, and the present solutions can also accelerate the learning phase. We provide a computational perspective of the forward propagation phase of a CNN.

Referring now to the drawings in which like numerals represent the same or similar elements and initially to FIG. 1, one layer of a typical CNN is illustratively depicted. Several such layers are cascaded to create a feed-forward neural network where each layer (except the last layer) feeds only the next layer, and a layer (except the first layer) receives inputs only from the immediately preceding layer. Every CNN layer is a cascade of three distinct computations or sub-layers: a convolution sub-layer 12, sub-sampling sub-layer 14, and non-linearity. Hardware implementations must also consider issues of numerical precision and dynamic range of values computed by the network.

Convolution sub-layer: A convolution sub-layer 12 accepts n images $I_1 \ldots I_n$ as inputs and produces m outputs $O_1 \ldots O_m$. To produce output $O_1$, images $I_1 \ldots I_n$ are individually convolved with kernels $K_{11} \ldots K_{n1}$ and the individual convolutions are summed, or aggregated. Convolution of fewer than n images with their respective kernels results in an intermediate (partial) output image roughly the same size as the input images. A "bias" value is added at adders 16 to each pixel in the aggregated output, and a suitable non-linear function (for example, tan h) is used to restrict the pixel value within a reasonable range. All kernels used in a layer of the CNN are of the same size (rows and columns). However, the number of input images, output images and kernel size vary from one CNN layer to another. Mathematically, output image $O_i$ in a single layer is obtained by $$O_i = \tanh\left(bias + \sum_{j=1}^{n} I_j * K_{ji}\right)$$

where $I_j * K_{ji}$ represents the convolution operation between image $I_j$ and kernel $K_{ji}$, and tan h is the non-linear function 18. With m*n image-kernel convolutions performed per CNN layer, from a computational point of view, the convolutions are the most computationally intensive portion of a CNN. If kernels are of size I, then the CNN degenerates into a regular neural network.

For convolving an image with Ir rows and Ic columns with a kernel with Wr rows and Wc columns, the computation workload is (Ir−Wr)*(Ic−Wc)*Wr*Wc multiply-accumulates (MACs). For one full layer of the CNN, we perform this convolution operation $I_n*O_m$ times. For each convolution operation, it is also easy to see that the computation ratio to memory input-output ratio is Wr*Wc since for every pixel fetched from memory, we perform (Wr*Wc) MACs. Therefore, CNNs, especially as the kernel sizes get larger, is computationally-intensive.

Sub-sampling and non-linearity: In FIG. 1, convolution sub-layer 14 output $O_1$ is sub-sampled. In the simplest case, sub-sampling averages four neighboring elements in $O_1$ to produce a single element in the output image $Z_i$. The output image $Z_1$, will have approximately half the number of rows and columns as compared with $O_1$. In general, $O_1$ can be sub-sampled by using a suitable sub-sampling kernel $S_1$. After sub-sampling, each element in the output can be subjected to a non-linear operation to produce one element of the output $Z_1$. A sub-sampled output image $Z_1$, is given by:

$$Z_1 = \tan h(O_i \cdot S_i)$$

where tan h is the non-linear function 22, and the operation $O_i \cdot S_i$ represents sub-sampling of image $O_i$ according to kernel $S_i$. Compared to the convolution sub-layer, sub-sampling is less computationally intensive since it requires an average of I-MAC operations per input pixel.

Parallelism in CNN: The CNN forward propagation task can be parallelized in several ways. In a multi-layer CNN, due to the feed-forward nature of forward propagation, the data dependencies between successive layers preclude parallel execution of all layers of the CNN. Therefore, task-parallelism across layers is limited and it is also more difficult to exploit.

Operator-level (fine-grained) parallelism: Consider one image-kernel convolution that convolves an image with Ir rows and Ic columns and a kernel with Wr rows and Wc columns. Each output pixel requires Wr*Wc multiply-accumulations all of which can be performed in parallel. The output pixels themselves are all independent. Numerous 2D-convolver designs exist that exploit the parallelism inherent in the image-kernel convolution, and we employ a standard systolic design. Practical considerations like available memory bandwidth, hardware computation resources, and power considerations do limit the amount of fine-grained parallelism that can be exploited in hardware. For example, it is not practical to simultaneously perform all the sub-convolutions in parallel due to the excessive memory bandwidth that will be necessary to bring in almost the entire image in one cycle.

Coarse-grain parallelism: if a CNN layer has n input images and m outputs, then all m*n image-kernel convolutions can, in theory, be performed in parallel. However, for typical m and n, provisioning enough memory bandwidth to keep m*n convolvers busy is impractical. With a smaller number of convolvers, we can extract parallelism in two ways: inter-output and intra-output. First, we can parallelize the computation of a single output image since it is the sum of n input-kernel convolutions. We refer to this as intra-output parallelism. Second, multiple output images can be computed in parallel, and we refer to this as inter-output parallelism. The key observation is that different layers in a single CNN network exhibit vastly different amounts of intra-output and inter-output parallelism. Due to this variability, a fixed hardware architecture will have poorer performance and higher memory traffic than an adaptive reconfigurable architecture.

Figure 2:
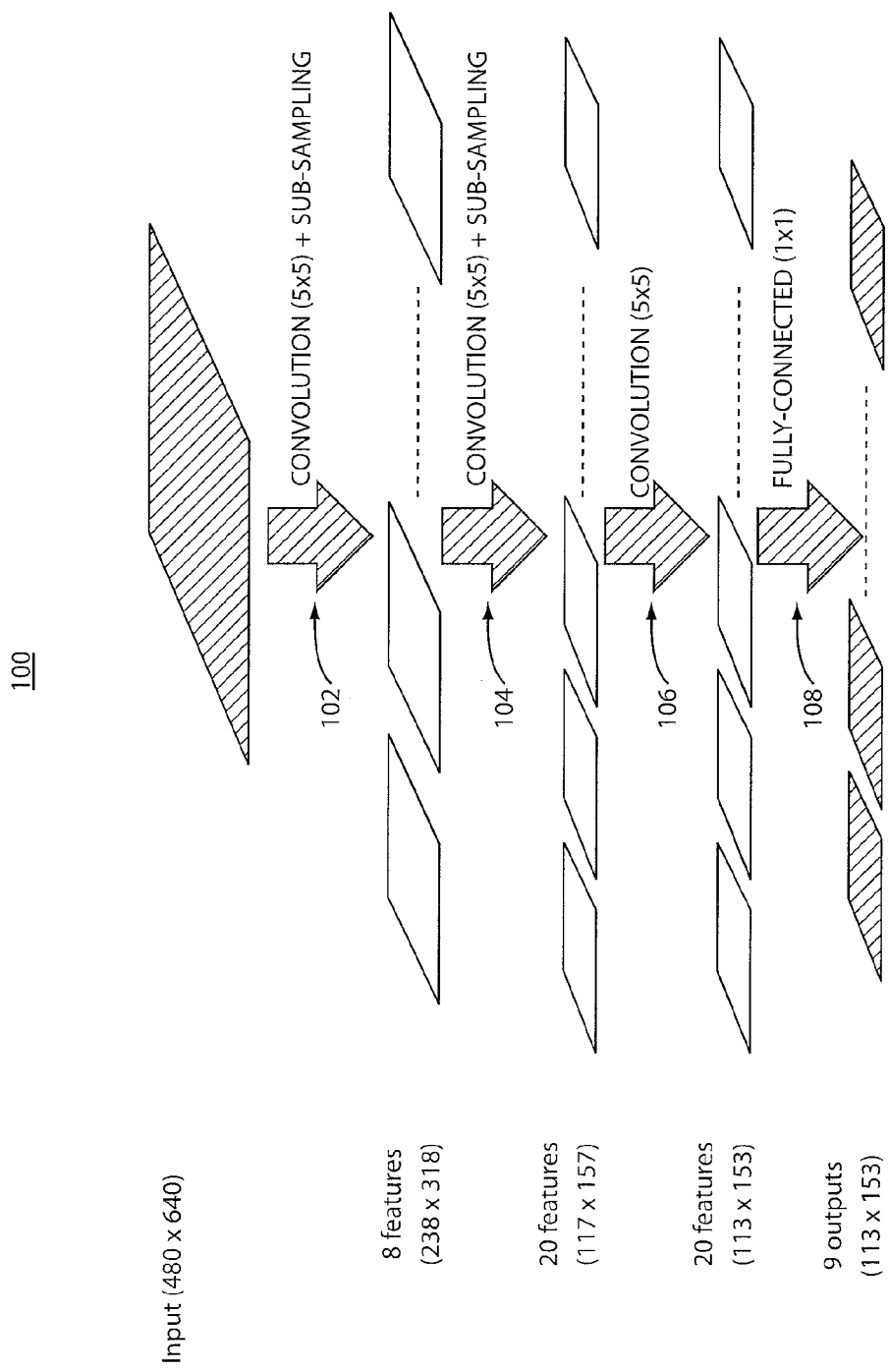
FIG. 2 is a diagram showing a layered neural network.

Referring to FIG. 2, a dynamically reconfigurable CNN coprocessor will be described for use with the illustrating example CNN network 100 as depicted. A real CNN network 100 that can detect faces along with their angle and pose is provided in this example. A resolution of the input image 102 is VGA (640×480). The network 100 has 4 layers 102, 104 106 and 108. The first two layers 102 and 104 employ both convolutions as well as sub-sampling (the figure leaves out non-linearity and bias for simplicity). The third layer 106 is only a convolutional layer while the last layer 108 is a traditional fully-connected layer where all inputs are connected to all outputs. The convolutional kernels (2D array of weights) are of size 5×5 in the entire network. The 9 outputs encode the face, its angle and pose within 113×153 different 32×32 "windows" of the original VGA input image.

Figure 3:
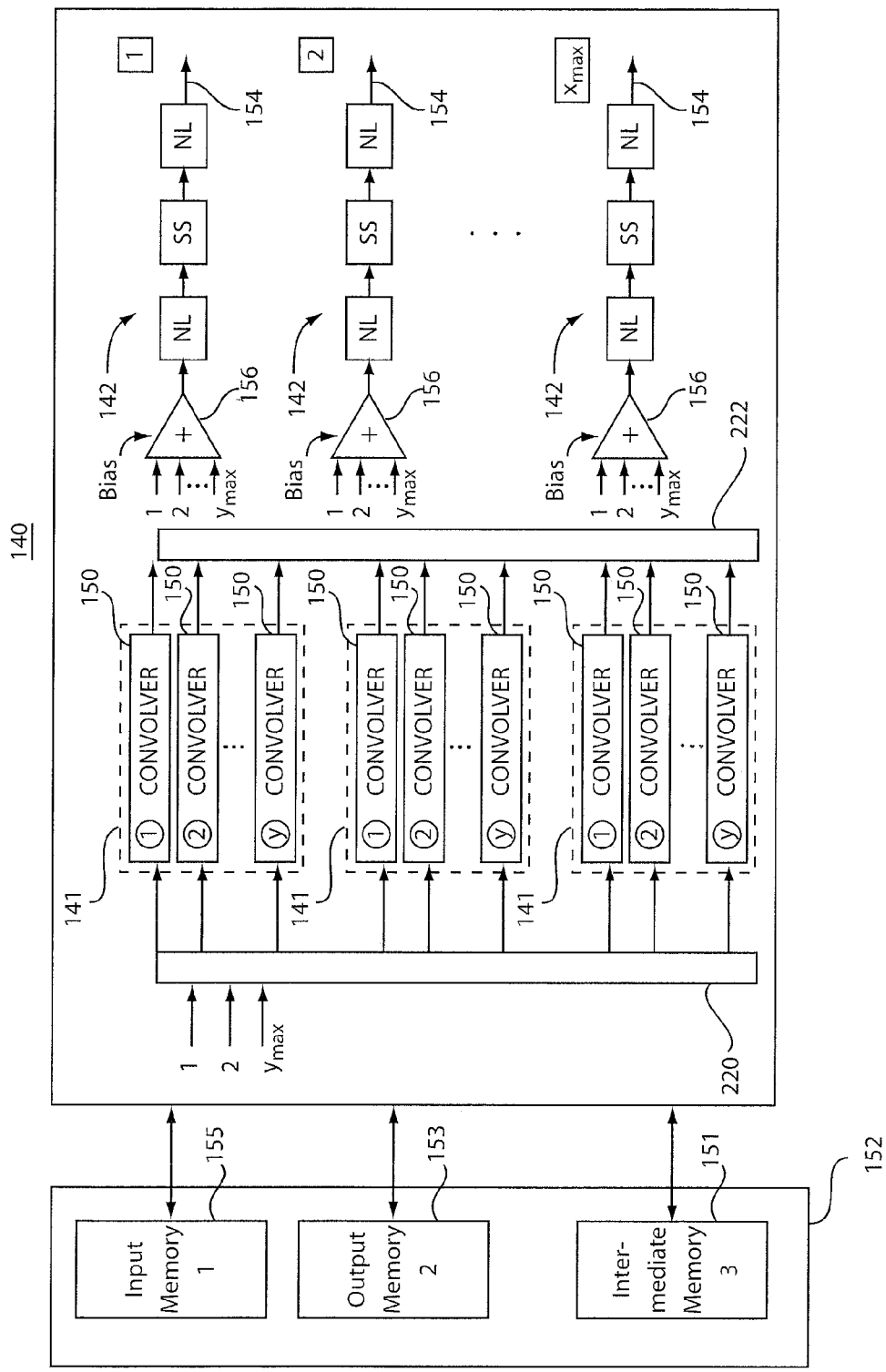
FIG. 3 is a block diagram showing an architectural template of a dynamic convolutional neural network processor in accordance with one embodiment.

Referring to FIG. 3, an architectural template 140 for a CNN coprocessor consists of a plurality of convolver primitives 150 connected to external memory 152. Each convolver primitive 150 can convolve one image with one kernel. Specified for the architecture are (i) C, the number of convolver primitives, (ii) M, the number of memory ports and (iii) P, the port width. The hardware also has no internal storage and all convolver primitives are fed data continuously in a streaming manner. Specifically, recall that each output plane in a CNN layer depends on n input planes. For hidden layers, these outputs are intermediate outputs. In the absence of internal storage, with fewer than n convolvers per output, intermediate accesses to off-chip memory will be needed.

Given this architectural template 140, there are different ways of organizing the convolver primitives within memory port constraints or output branches 142. We will show that the different layers of the above CNN benefit most from different organizations, thereby necessitating a dynamically reconfigurable architecture. We first note that all layers have fine-grained parallelism within a convolution operation. However, a traditional micro-processor cannot effectively leverage that parallelism since the thread synchronization overhead will more than compensate for any speedups achieved, and result in an overall slowdown. Our convolution primitives handle the parallelism inherent in a convolution using well-known systolic architectures.

Of more interest are the inter-output and intra-output parallelisms. The first layer (102, FIG. 2), which produces 8 outputs from a single output exhibits inter-output parallelism, while the second layer (104, FIG. 2) exhibits intra-output parallelism. Let us assume the hardware has 8 convolver primitives, 2 memory ports of width 8 pixels (i.e., the ability to transfer 8 packed pixels per port each cycle). Consider the first layer 102 which has 1 input image and 8 outputs. If we organize, 8 available convolver primitives with a single broadcast input and 8 outputs, they will work in parallel and execute the first layer with maximum efficiency. However the same arrangement will work poorly for the second layer 104 which has 8 input images and 20 output images. With a single broadcast input and 8 convolvers, we can only process one input at a time, but compute 8 partial outputs in parallel. With no intermediate storage, the 8 partially computed outputs need to be written out to off-chip memory resulting in an increase in intermediate data memory traffic. Further, each input, which participates in producing 20 outputs, will have to be processed three times to generate and write out all 20 outputs.

On the other hand, if the second layer 104 had a different arrangement of the 8 convolver primitives where we had 8 parallel inputs to each of the 8 convolvers and a single output, we can compute all the outputs sequentially, but each output computation will be parallelized since all 8 inputs are read and processed in parallel. There is no intermediate data to be written off-chip since no partial outputs are computed. This is intra-output parallelism.

This observation demonstrates that for a given resource budget, each layer of the CNN needs different parallel organizations. This example serves to illustrate the main benefit of dynamic reconfigurability for CNN hardware.

Figure 4:
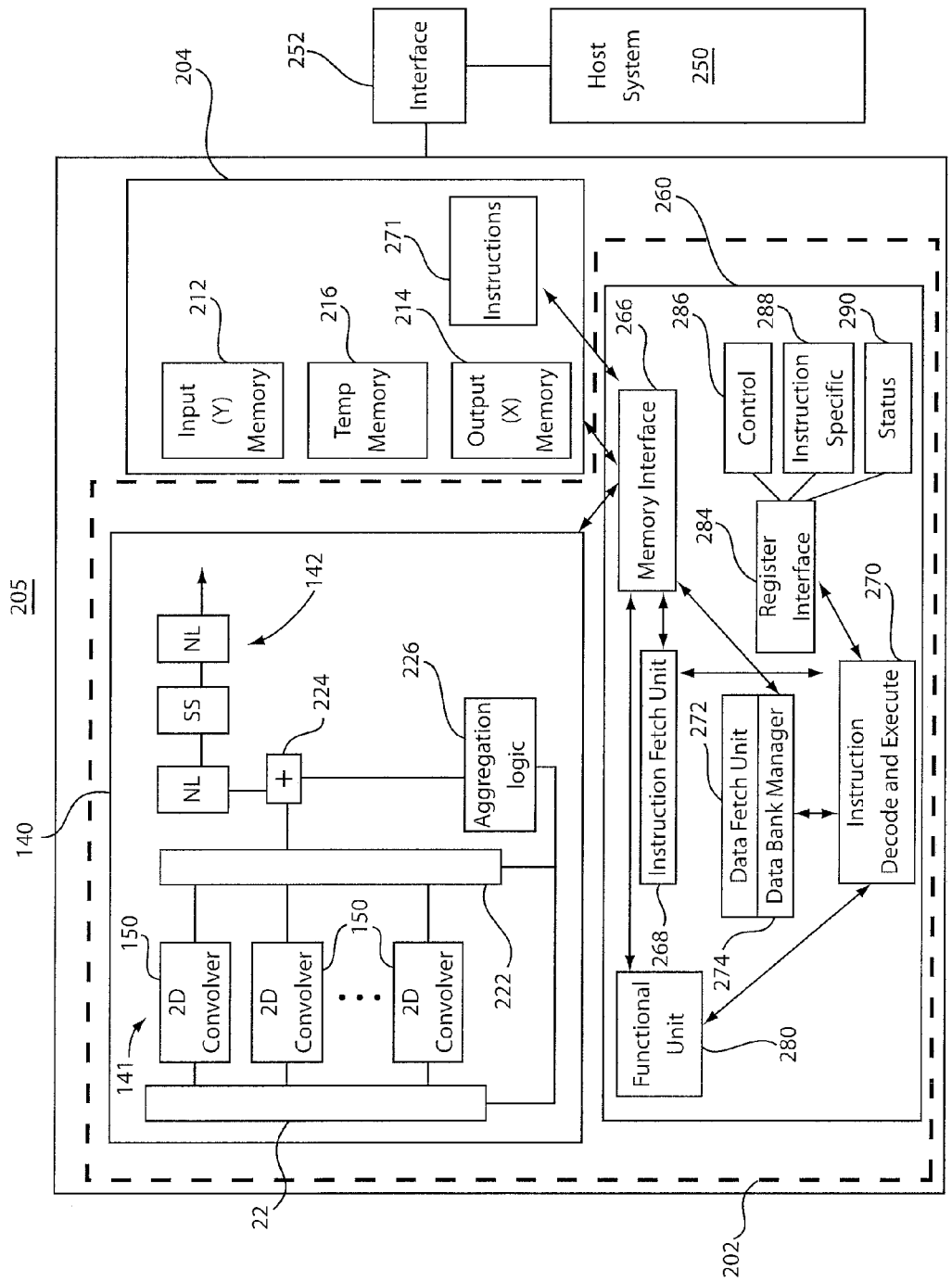
FIG. 4 is a block diagram showing a dynamic convolutional neural network processor system in accordance with one embodiment.

Referring to FIG. 4, a CNN coprocessor architecture 205 will be described in accordance with an illustrative embodiment. The dynamically reconfigurable hardware architecture for the CNN coprocessor system 205 primarily includes a processing core 202 and a memory sub-system 204. The processing core 202 itself is stateless, and all processing elements are forced to be always busy. This means that input, intermediate and output data are continuously streaming between the processing core 202 and the memory sub-system 204.

Referring again to FIG. 3, a CNN layer reads one or more images as inputs and produces one or more output images. The basic computation primitive is a 2D convolver 150 that can store a kernel internally. We group Y such convolvers into a computational element 141 as shown in FIG. 3. The computational element 141 has Y inputs from external memory 152 and one output 154. It also has a specialized hardware pipeline to compute the non-linearity (NL), sub-sampling (SS) and bias at adders 156. This element can compute the convolved sum of Y images with Y corresponding kernels and produce one output. If more than Y images are to be combined to realize an output, the convolver output is considered as intermediate data that is stored in off-chip memory 152. The off-chip memory includes input memory 155, output memory 153 and optionally intermediate memory 151. An input switch 220 and an output switch 22 are configurable to handle different types of parallelism as will be explained in greater detail below.

The computational elements related to Y are architected to extract intra-output parallelism. An array of X computational elements where the inputs of the first element are broadcast to every other element can leverage inter-output parallelism by computing X outputs simultaneously. By varying X and Y, we can adjust the extent to which the two different parallelisms are parlayed.

Referring again to FIG. 4, the memory subsystem 204 has a large impact on the performance of CNNs as well as other artificial neural networks. In particular, the flexibility of a banked memory subsystem 204 is advantageous for CNNs compared to a single banked subsystem with the same aggregate memory bandwidth and storage. Therefore, unlike GPUs, for instance, that provide raw memory bandwidth, the present architecture provides multiple banks that can be simultaneously read from and written to, which is needed since the present processing core 202 is stateless.

For any CNN with the stateless, streaming architecture, at least two memory banks 212 and 214 are provisioned—one for the input, and the other for the output. We assume that the each memory bank has the necessary port width (and the data is appropriately packed) to read Y input pixels and write X output pixels. If Y is smaller than $I_n$ (the input), we may need multiple passes to process each output, thereby generating intermediate data. Therefore, to ensure uninterrupted flow, a third memory bank 216 may be provisioned. With three banks, assuming each provides enough port width to accommodate the respective packed reads and writes, we can maintain uninterrupted data flow, with all convolvers 150 busy in the stateless architecture.

Y and X also determine memory bandwidth requirements. Y is the number of different input pixels fetched simultaneously from the memory subsystem 204 every cycle. X is the number of output pixels or intermediate values produced every cycle. Depending on the pixel resolution and the number of bits used to represent intermediate values, we can estimate memory bandwidth. For example, if pixel values are represented using 2 bytes, and the intermediate values are represented using 4 bytes, then the read bandwidth per cycle is 2 Y+4X bytes.

Scaling the number of processing elements in a chip or board 202 is easier than scaling off-chip memory bandwidth. Therefore, in practice, finding the optimal values of Y and X for a CNN layer becomes finding a judicious mix of intra-output and inter-output parallelism that saturates the available off-chip bandwidth.

Data transfers for intermediate data can dominate and outweigh the benefits of parallelism within a block. Clever data-packing strategies to minimize the memory bandwidth consumed by the movement of intermediate data become an integral part of the coprocessor design. Also, since we process one layer of the CNN at a time, outputs from one layer of the CNN have to be laid out in external memory 204 so that the next layer can rapidly read this data as input. The amount of intermediate data that has to be stored in external memory 204 also depends on specific groupings of parallel computations into blocks. Virtual processing of the CNN computations (i.e. time-sharing) on a fixed amount of hardware resources introduces complex control and data flows that may not be natively supported in general-purpose parallel hardware like general-purpose multicores or GPUs. Efficient realization of these flows is needed to preserve the performance gained from parallel computations in a block.

To make the core 202 adapt to the different types of parallelism across CNN layers, we introduce an input switch 220 and an output switch 222. The switches 220 and 222 permit a fixed number of convolvers 150 to be grouped in different ways by allowing Y and X to be varied. The maximum values of Y and X are determined by the memory bandwidths. With a 3-port architecture, if the memory bandwidth per port is P bits per cycle, the input pixel width $I_b$, intermediate data width $T_b$ and output pixel width $O_b$, the maximum value of $$Y_{max} \text{ is } \left[\min\left(\frac{P}{I_b}, \frac{P}{T_b}\right)\right].$$

Similarly, the maximum value of X, given by $$X_{max} \text{ is } \left[\min\left(\frac{P}{O_b}, \frac{P}{T_b}\right)\right].$$

Note every computational element has to sum the X convolutions prior to non-linearity (NL) blocks and sub-sampling (SS) blocks. Since Y can change in the reconfigurable architecture, this summation is achieved by using a plurality of adders 224 (or other aggregation logic 226) each statically designed to add $Y_{max}$ values. Specifically, we need $X_{max}$ adders, each with $Y_{max}$ inputs. The output switch 222 appropriately routes the Y.X outputs to the inputs of these adders 224. The routing is done in a block-wise fashion, i.e., groups of Y outputs from the convolvers 150 are routed to a single $Y_{max}$-input adder (see also FIG. 3).

The CNN coprocessor 202 attaches to a separate host processor 250 that executes a main application. However, the host 250 off-loads the entire CNN computation to the co-processor 202. In particular, the host transfers the input images and the detailed CNN network structure (number of layers, kernels used in each layer, bias values, sampling kernels, non-linearity, etc.) to the co-processor 202. The coprocessor 202 has access to external memory banks 204 (e.g., three banks) to store input images, kernels and intermediate data. Coprocessor 202 performs forward propagation across all the network layers and returns the output of the last layer back to the host 250.

A high-level of abstraction for a host interface 252 may be selected since implementing only the convolution task on the co-processor 202 will need the host to coordinate complex control and data flows, and may degrade the performance. Also, significant amounts of intermediate data are generated within and across layers of the CNN, and moving the intermediate data across the slow host-coprocessor interface 252 might negate any advantage gained from performing fast convolutions on the co-processor 202.

Coprocessor 202 includes a learning engine controller 260 which supports configurations for the computational elements 141 and output branches 142. The controller 260 enables the configurations of the input switch 220 and the output switch 222 in accordance with user input, software of other mechanisms using a function unit interface 280. Controller 260 may include a memory interface 266, which interfaces with memory subsystem 204. Memory system 204 includes instructions 271 (e.g., VLIW instructions) stored therein. These instructions 271 are fetched using an instruction fetch unit 268, and decoded and executed by a decode and execution unit 270. A data fetch unit 272 fetches the data from memory subsystem 204 in accordance with executed instructions. A data bank manager 274 provides the data to a functional unit interface 280, which is employed for programming/configuring the input switch 220 and the output switch 222. The instruction execution unit 270 executes instructions in accordance with programmed configurations stored in registers. The execution unit 270 interfaces with registers through a register interface 284. The registers may include control registers 286, functional unit specific registers 288, status registers 290, etc.

Domain-experts or users can specify arbitrary CNN networks by using a simple, high abstraction level software programming API through a host system 252 (other methods may be employed for specifying as well). A CNN compiler automatically translates the entire high abstraction network specification into a parallel microprogram (a sequence of low-level VLIW instructions) that is mapped, scheduled and executed by the controller 260 of coprocessor 202. Instructions to facilitate complex control and data flows, as well as on-the-fly packing of intermediate data to minimize off-chip memory transfers, are also natively supported by the coprocessor 202. In one example, using a 115 MHz prototype co-processor implementation (that may emulated, e.g., on an off-the-shelf PCI FPGA card), diverse CNN workloads were executed 30× to 40× faster than a parallel software implementation on a 2.2 GHz AMD Opteron processor.

The learning controller 260 is set up to configure and reconfigure the switches 220 and 222 to process different layers of the CNN. The switches 220 and 222 may be switched between different parallelism types between layers and/or neural networks. The controller instructions may be optimized in advance or programmed dynamically based on data formatting, control commands or any other mechanism to optimize processing.

In one embodiment, patterns or models may be employed to determine an optimal configuration for processing a layers or layers of a neural network. This may be based on previous process executions, instruction set performance, gathered metrics, etc. The selection of parameter X and Y may be based upon a type of network, a type of layer in the network, user preference, etc.

The hardware architecture automatically analyzes CNN workloads and dynamically configures its hardware and software components to match the exact mix of different types of parallelism in a given CNN workload. The architecture is preferably forward-scalable, as we can scale the number of processing elements, and the available off-chip memory bandwidth, thus automatically improving the performance of CNN applications. The architecture determines the optimal configuration of processing elements and memory architecture for each layer of the CNN workload, and the architecture is dynamically configured to match the workload characteristics. This permits the throughput and performance of the hardware to function very close to peak performance through the process.

Figure 5:
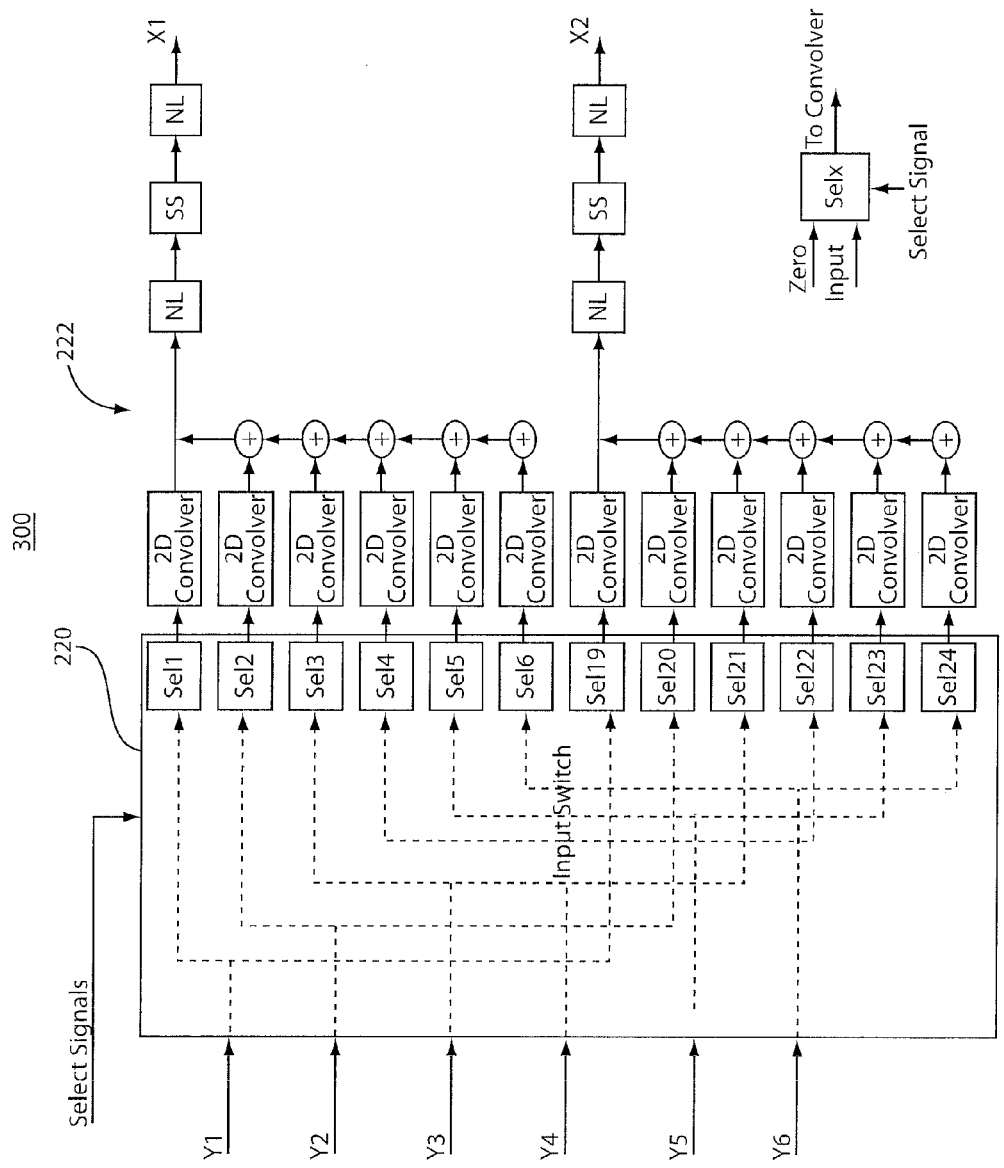
FIG. 5 is a block diagram showing an illustrative example of the dynamic convolutional neural network processor in accordance with the present principles.

Referring to FIG. 5, input switch 220 and output switch 222 are illustratively depicted for an exemplary design architecture 300. Architecture 300 includes $Y_{max}$=6 and $X_{max}$=2. The input switch 220 is constructed from a simple selector (multiplexor) that accepts three inputs (one select signal, and two input values one of which is a 0). Depending on the value of the 'Select' signal or control signal, the selector either produces a 0 value as output or it forwards the input value. For example, consider the computational element X1. It has selector elements labeled "Sel1" through "Sel6" that receive one of their inputs from six input images Y1-Y6. Since there are 2 computational elements in this design (X1 and X2), we use a total of 12 selectors. Note that the six inputs labeled Y1 . . . Y6 are also routed to the selector elements ("Sel19" through "Sel24") of computational element X2.

We achieve dynamic configurability as follows. For a configuration with 3 input images (Y1, Y2 and Y3), and one output element X1, we generate select signals so that the first three selectors of X1 or X2 computational elements (i.e. selectors "Sel1" through 'Sel3", and "Sel19" through "Sel21") are enabled to forward their inputs to 2D convolvers (2d Conv). All other selectors are configured to produce an output value of 0. Note that the 2D convolvers (2d Conv) are also designed to be disabled if the corresponding selector is providing a 0 output (this is not required for correctness of the result, but it saves the power consumed by the convolver).

In a simple implementation of the output switch 222, we chain the 2D convolvers (2d Conv) in a computational element to realize the pipelined summation of the convolver outputs. Since the dynamic configuration has three input images, convolvers connected to selectors "Sel1" through 'Sel3" and "Sel19" through "Sel21" are active.

Scaling the number of processing elements in a chip is easier than scaling off-chip memory bandwidth. Therefore, in practice, finding the optimal values of Y and X for a CNN layer comes down to finding a judicious mix of intra-output and inter-output parallelism that saturates the available off-chip bandwidth. Examine constraints on Y and X, assuming a 3-bank memory subsystem where each bank transfers P bits per cycle. Again, assume that the input pixel width is $I_b$, intermediate data width is $T_b$, output pixel width is $O_b$ and that there are C convolvers in the hardware. The product of Y and X must be less than or equal to the total hardware available which means X*Y C. Several constraints are due to the memory sub-system. Specifically, it is straightforward to see that: $X*I_B$ P (if X is used to write intermediate data); $X*O_B$ P (if X is used to write final outputs); $Y*T_B$ P (if Y is used to read intermediate data); and $Y*I_B$ P (if Y is used to read first layer inputs).

Referring again to FIG. 4, each layer of the CNN reads one or more images as input, and it computes one or more output images as output. The basic computational element is designed to compute one output image at a time. If the coprocessor 202 reads one pixel in every cycle, then the time taken for reading the input is the same as the total number of pixels in the input images. If the memory architecture is designed so that the co-processor 202 can input multiple pixels in one cycle, then the time taken for reading the input information will reduce proportionally. Either way, every pixel in every input image has to be examined at least once to compute an output image. Fetching data from off-chip memory 204 consumes significantly more power than operations performed within the coprocessor 202. For example, fetching a 16-bit operand from off-chip memory consumes about 33 times more power than the addition operation itself on a 1.5 volt, 0.8 micron CMOS technology processor. Therefore, minimizing memory transfers has a significant effect on power consumption.

One design goal is to read each input pixel exactly once, and compute the output image within a few (fixed number of) cycles after the last input pixel is read. By computing the output image in approximately the same time it takes to read input data, the basic computational element is optimal with respect to a given off-chip memory bandwidth, power consumption, and throughput.

With multiple computational elements, each input image can be simultaneously used to compute more than one output image. Since the same images are needed to compute different output images, we can fetch the input image only once for a set of output images that are being computed simultaneously.

Numerical precision and dynamic range: This is an issue that is common to neural network implementations, including CNN implementations. CNN computations in software are usually performed using floating point arithmetic. The feasibility of using floating-point arithmetic for neural network implementations is difficult to implement in neural network hardware.

Selection of the precision to which a hardware implementation will approximate kernel values (weights), pixel values in input images (as well as pixel values in intermediate images generated during the processing of the CNN), and intermediate data values also points to a floating point representation. Precision needed and the dynamic range encountered is usually a problem and data dependent. Precision of weights has been used historically to trade-off the capabilities of neural networks against implementation cost. A higher weight precision means fewer quantization errors in the implementation, while a lower precision leads to simpler designs, greater speed and reduction in area requirements or power consumption.

The coprocessor 202 supports integer operations. Integer operations (multipliers) offer a significant performance gain over floating point operations (multipliers). However, fixed-point precision may be employed to minimize loss of accuracy in the outputs. Application developers may determine the fixed-point precision needed to represent kernel values and pixel values in the input and output planes. For example, for the face detection application considered herein, we used the software version of the application to lower the precision, starting from double precision floating point, until the results visually differed. We found that 20-bits of fixed point precision sufficed for kernel values, and 16-bits of fixed-point precision was adequate for all other values in the input and output planes. To adequately capture the dynamic range, intermediate results of multiplication or addition operation are represented as 48-bits to ensure that repeated additions during the convolution and aggregation phases do not cause an overflow. Note that the word-length for input, kernel and intermediate values can differ but hardware implementations support some maximum fixed word length for input, kernel and intermediate values.

In one illustrative architecture a plurality of 2D convolvers (e.g., 40) and 3 memory ports each capable of providing 128 bits of data per cycle. The CNN workloads' input and output widths were 16 bits, and the intermediate data was 48 bits. In all cases tested, a dynamically reconfigurable architecture in accordance with the present principles produced a speedup ranging from 1.2× to 3.5×.

A dynamically reconfigurable architecture for the convolutional neural network (CNN) is disclosed and provides an important machine learning method used in recognition, analysis and reasoning (RAR) applications. The design of the architecture is driven by at least two observations. A first is based on the fact that CNNs exhibit "inter-output" and "intra-output" parallelism. Inter-output parallelism is where different outputs can be computed independently, and in parallel. Intra-output parallelism exploits parallelism within a single output computation. Different CNN workloads exhibit a widely varying mix of these two types of parallelism within a single network. That is, different layers of a network can be parallelized in different ways. The present architecture itself adapts to the way a particular layer of a network needs to be parallelized. This adaptive architecture is achieved by allocating a plurality of convolver primitives and reconfiguring their organization at run-time to achieve optimal performance. A second observation is based on the fact that CNNs have large intermediate data which cannot be stored on-chip. Therefore, a streaming architecture is provided with multiple memory ports where input data, intermediate data and output data are continuously flowing between the coprocessor and off-chip memory.

We demonstrate through simulation that such a reconfigurable architecture can provide speedups ranging from 1.2× to 3.5× over a similar fixed custom architecture with the best possible fixed configuration of the convolver primitives.

Figure 6:
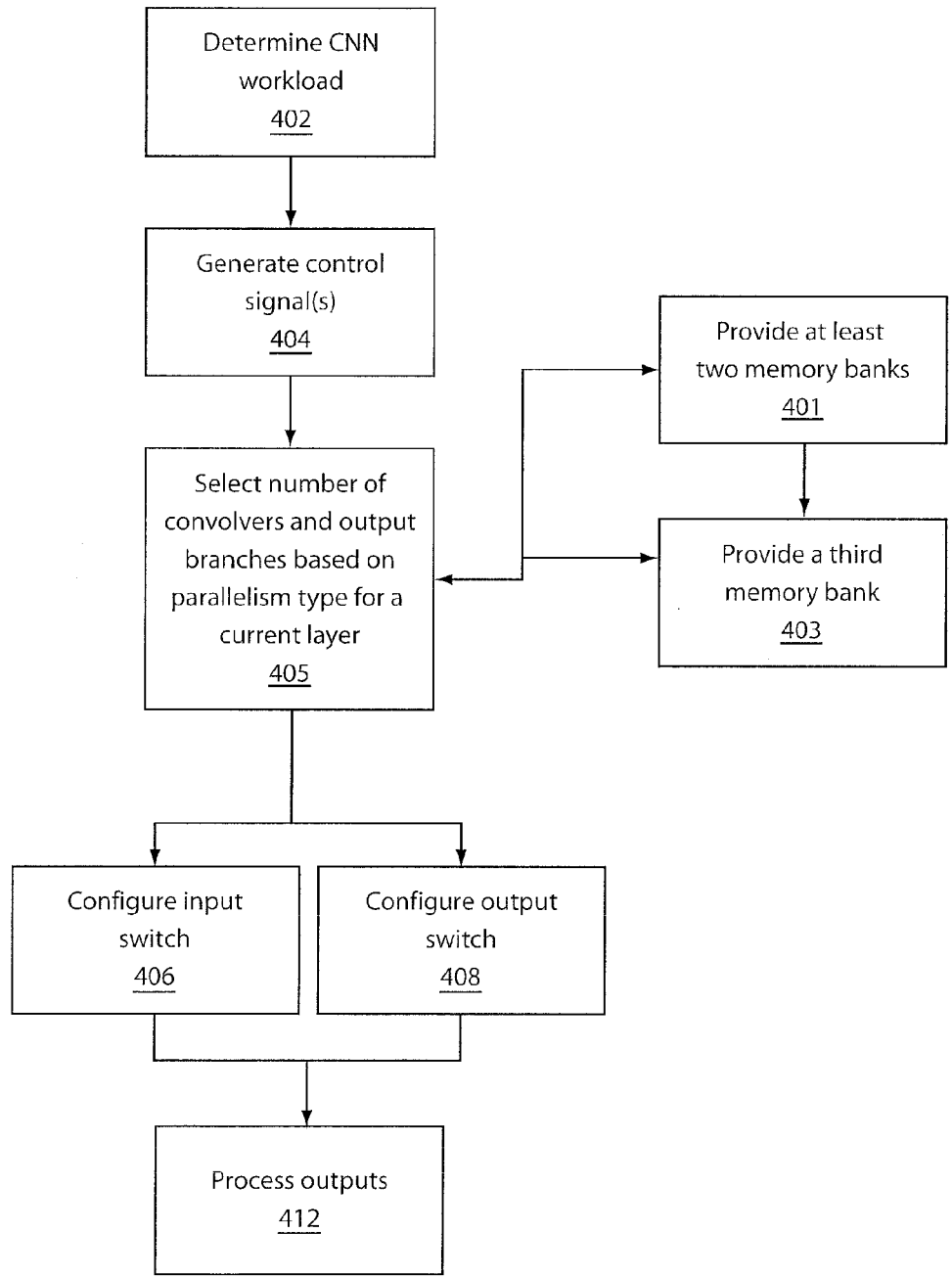
FIG. 6 is a flow diagram showing a process for dynamically adjusting the convolutional neural network processor in accordance with the present principles.

Referring to FIG. 6, a method for processing convolutional neural networks (CNN) is illustratively shown in accordance with one embodiment. In block 402, a workload for a convolutional neural network is determined. In block 404, a control signal based upon the workload is generated to permit a selection of a type of parallelism to be employed in processing a layer of the CNN.

In block 405, the number of convolvers and the number of output branches are selected based upon a type of parallelism needed for a given neural network layer, wherein the type of parallelism may includes one of parallelism within a convolution operation, inter-output parallelism and intra-output parallelism. The parallelism can be determined based upon the workload.

In block 406, an input switch is configured to enable a number of convolvers which convolve an input in accordance with the control signal. In block 408, an output switch is configured to enable a number of output branches for a given cycle in accordance with the control signal.

In block 412, outputs from the output branches are processed. The processing also includes employing functions (e.g., non-linear functions and sub-sampling inputs to determine outputs). For a next layer to be processed, the input switch and the output switch are reconfigured dynamically in accordance with the next layer of the CNN to be processed.

In block 401, a memory subsystem is provided having at least two banks, wherein a first bank provides input storage and a second bank provides output storage to enable a stateless, streaming coprocessor architecture. In block 403, a third memory bank is provided for storing intermediate results.

Having described preferred embodiments of a system and method for a dynamically configurable, multi-ported coprocessor for convolutional neural networks (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for processing convolutional neural networks (CNN), comprising:
    determining a workload for a convolutional neural networks;
    generating a control signal based upon the workload to permit a selection of a type of parallelism to be employed in processing a layer of the CNN;
    configuring an input switch to enable a number of convolvers which convolve an input in accordance with the control signal;
    configuring an output switch to enable a number of output branches for a given cycle in accordance with the control signal; and
    processing outputs from the output branches, said processing including reconfiguring the input switch and the output switch in accordance with a next layer of the CNN to be processed.

2. The method as recited in claim 1, further comprising selecting the number of convolvers and the number of output branches based upon a type of parallelism needed for a given neural network layer.

3. The method as recited in claim 2, wherein the type of parallelism includes one of parallelism within a convolution operation, inter-output parallelism and intra-output parallelism.

4. The method as recited in claim 1, further comprising providing a memory subsystem having at least two banks, wherein a first bank provides input storage and a second bank provides output storage to enable a stateless, streaming coprocessor architecture.

5. The method as recited in claim 4, further comprising providing a third memory bank for storing intermediate results.

* * * * *